(12) United States Patent
Wan

(10) Patent No.: US 11,349,329 B2
(45) Date of Patent: May 31, 2022

(54) LOW-RADIATION UNINTERRUPTIBLE POWER SUPPLY

(71) Applicant: Yu Wan, Heilongjiang (CN)

(72) Inventor: Yu Wan, Heilongjiang (CN)

( * ) Notice: Subject to any disclaimer, the term of this patent is extended or adjusted under 35 U.S.C. 154(b) by 238 days.

(21) Appl. No.: 16/468,899

(22) PCT Filed: Dec. 15, 2016

(86) PCT No.: PCT/CN2016/110031
§ 371 (c)(1),
(2) Date: Jun. 12, 2019

(87) PCT Pub. No.: WO2018/107412
PCT Pub. Date: Jun. 21, 2018

(65) Prior Publication Data
US 2020/0083735 A1 Mar. 12, 2020

(51) Int. Cl.
*H02J 7/00* (2006.01)
*H02J 7/02* (2016.01)
*H02J 7/04* (2006.01)
*H02J 9/06* (2006.01)
*H02J 7/10* (2006.01)

(52) U.S. Cl.
CPC ............ *H02J 7/022* (2013.01); *H02J 7/0047* (2013.01); *H02J 7/045* (2013.01); *H02J 9/062* (2013.01); *H02J 7/0048* (2020.01); *H02J 7/00304* (2020.01); *H02J 2007/10* (2013.01)

(58) Field of Classification Search
CPC ...................................................... H02J 7/022
USPC ....................................................... 320/128
See application file for complete search history.

(56) References Cited

U.S. PATENT DOCUMENTS

| | | | |
|---|---|---|---|
| 5,528,149 A | 6/1996 | Chen | |
| 5,874,788 A | 2/1999 | McCartney | |
| 8,314,593 B2 * | 11/2012 | Yeh ........................ | H02J 9/062 320/128 |
| 2001/0028571 A1 | 10/2001 | Hanada et al. | |

(Continued)

FOREIGN PATENT DOCUMENTS

| | | | |
|---|---|---|---|
| CN | 201750208 | * | 2/2011 |
| CN | 201750208 U | | 2/2011 |

(Continued)

OTHER PUBLICATIONS

International Search Report (PCT/ISA/210) and translation and Written Opinion (PCT/ISA/237) dated Sep. 18, 2017, by the Chinese Patent Office as the International Searching Authority for International Application No. PCT/CN2016/110031.

(Continued)

*Primary Examiner* — Yalkew Fantu
(74) *Attorney, Agent, or Firm* — Buchanan Ingersoll & Rooney PC

(57) ABSTRACT

An AC-DC type uninterruptible power supply includes a rectifying unit, a battery control unit and a switching unit, wherein the rectifying unit is used for rectifying an AC from a power network and outputting a DC; a battery is controlled by the battery control unit to be charged or discharged and outputs a DC during interruption of the AC from the power network; and the switching unit is used for selectively outputting the DC from the rectifying unit or the DC from the battery. Inversion of the UPS and double rectification of a load are omitted.

12 Claims, 2 Drawing Sheets

(56) References Cited

U.S. PATENT DOCUMENTS

| | | | |
|---|---|---|---|
| 2002/0030411 A1* | 3/2002 | Curtis | H02M 7/53832 307/64 |
| 2002/0140403 A1* | 10/2002 | Reddy | H02M 7/4807 320/162 |
| 2003/0026113 A1* | 2/2003 | Reilly | H02M 7/53832 363/37 |
| 2010/0013313 A1 | 1/2010 | Groff et al. | |
| 2011/0194277 A1 | 8/2011 | Yamaguchi | |
| 2015/0061385 A1* | 3/2015 | Nommensen | H02J 9/00 307/23 |

FOREIGN PATENT DOCUMENTS

| | | | |
|---|---|---|---|
| CN | 102148515 | * | 8/2011 |
| CN | 102148515 A | | 8/2011 |
| CN | 102647019 A | | 8/2012 |
| CN | 205004806 U | | 1/2016 |
| JP | H 05-146091 A | | 6/1993 |
| JP | H 05-211732 A | | 8/1993 |
| JP | H 08-182221 A | | 7/1996 |
| JP | 2000323365 A | | 11/2000 |
| JP | 2002262466 A | | 9/2002 |
| JP | 2008022641 A | | 1/2008 |
| JP | 2013090346 A | | 5/2013 |
| TW | 201443447 A | | 11/2014 |

OTHER PUBLICATIONS

The extended European Search Report dated May 27, 2020, by the European Patent Office in corresponding European Application No. 16923639.5. (7 pages).

Office Action (Decision to Grant a Patent) dated Feb. 9, 2021, by the Japanese Patent Office in corresponding Japanese Patent Application No. 2019-532743, and an English Translation of the Office Action. (5 pages).

Written Amendment dated Jan. 18, 2021, by the Japanese Patent Office in corresponding Japanese Patent Application No. 2019-532743, and an English Translation of the Office Action. (4 pages).

* cited by examiner

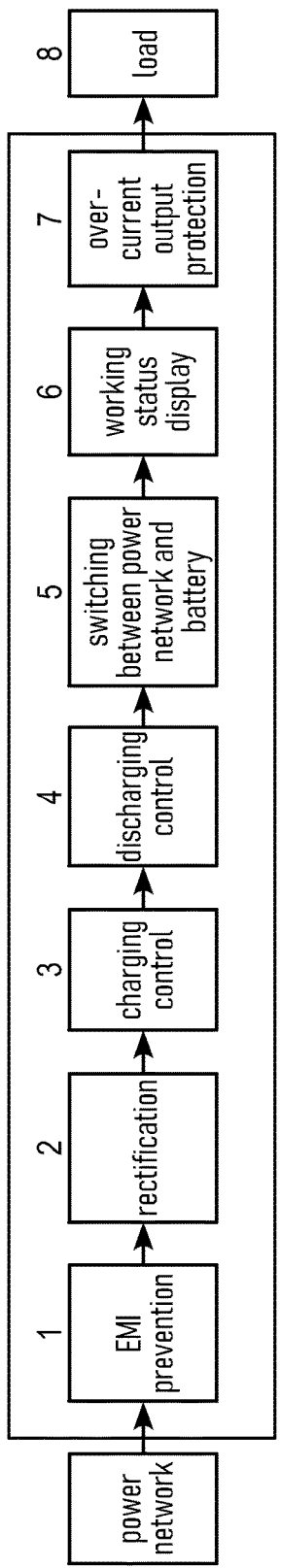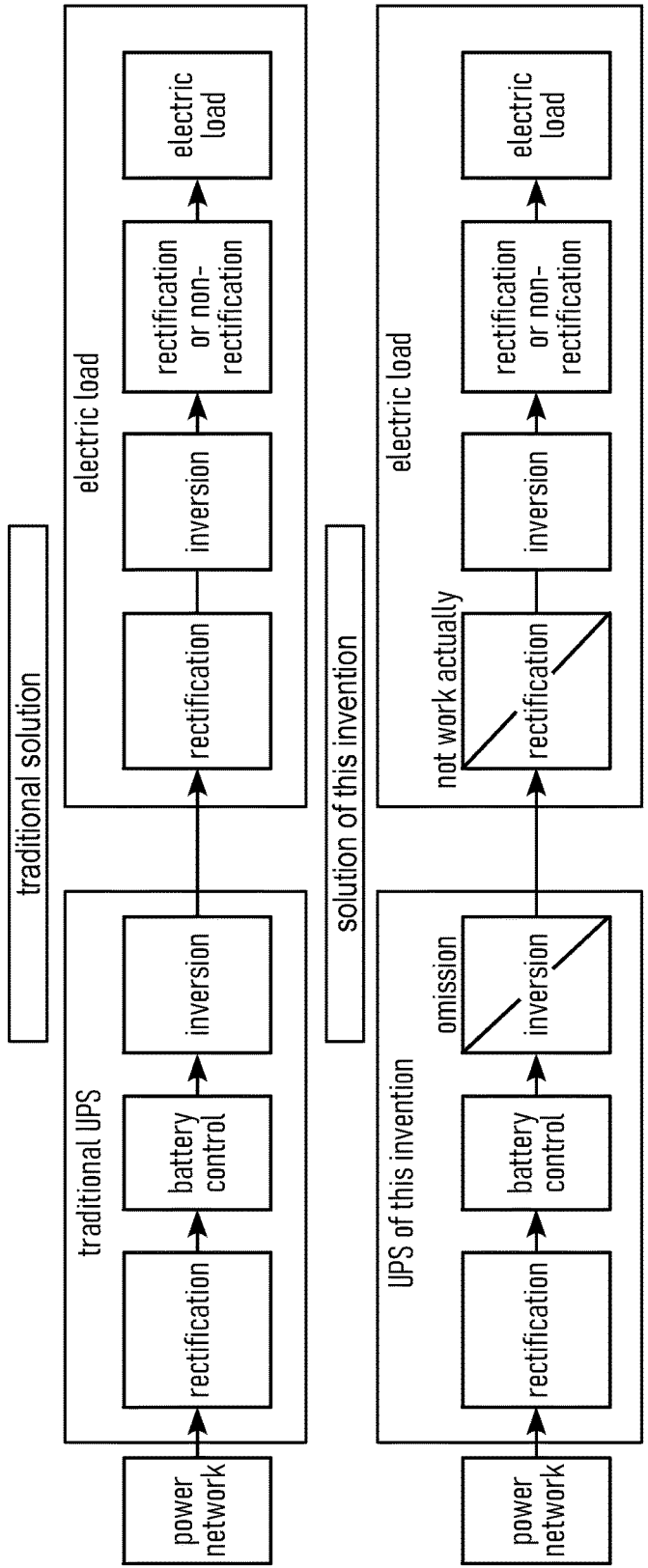

LOW-RADIATION UNINTERRUPTIBLE POWER SUPPLY

BACKGROUND OF THE INVENTION

1. Technical Field

The invention relates to a power supply, in particular to an on-line or back-up uninterruptible power supply.

2. Description of Related Art

At present, both an off-line uninterruptible power supply and an on-line uninterruptible power supply work in an AC-DC-AC conversion mode, namely a DC power supply rectified from power supplied by the power network is inverted by means of a sine wave or a switch power supply or through a PWM method so as to output a power supply having frequencies adapted to electricity loads as well as stable voltages. Such on-line uninterruptible power supplies have the defects of complex circuits, low efficiency, large EMC electromagnetic radiation interferences, low reliability, and high costs.

Computer systems, network equipment, instruments, numerical control equipment, automatic production lines, robots, manipulators, televisions, entertainment systems, various variable-frequency control refrigerators, air conditioners and elevators, all equipment having voltages converted by means of a switching power supply, charging devices, LED illuminators, and other loads supply power to terminal appliances in a power network-rectification-inversion-(variable-frequency or constant-frequency)-(rectification or non-rectification) mode. FIG. 1 is a composition block diagram of an uninterruptible power supply of the prior art. As can be seen, it is a complex process from the power network and the uninterruptible power supply to an electrical terminal.

Thus, it is necessary to improve the uninterruptible power supply of the prior art.

BRIEF SUMMARY OF THE INVENTION

An embodiment of the invention provides an uninterruptible power supply. The uninterruptible power supply includes a rectifying unit, a battery control unit and a switching unit, wherein the rectifying unit rectifies an AC from a power network or other equipment and outputs a DC; a battery is controlled by the battery control unit to be charged and outputs a DC during interruption of the AC from the power network; and the switching unit selectively outputs the DC from the rectifying unit or the DC from the battery.

Optionally, a filter unit performs electromagnetic interference filtering on the AC, and a charging control unit is coupled to the filter unit through a first capacitor.

The switching unit may include a diode which has a negative electrode coupled to an output terminal of the rectifying unit and a positive electrode coupled to a positive electrode of the battery.

The battery control unit may include a detection circuit used for detecting voltages of the battery, so that charging and/or output of the battery are/is controlled according to a detection result. A second capacitor is connected to an output terminal of the power supply in parallel.

Optionally, the battery control unit includes a first semiconductor switch, wherein the first semiconductor switch is coupled between the output terminal of the rectifying circuit and the battery; and the detection circuit detects whether or not the battery is fully charged and controls on-off of the first semiconductor switch according to the charged condition of the battery.

Optionally, the battery control unit includes a second semiconductor switch coupled between the battery and the switching unit; and the detection circuit detects a discharged condition of the battery and controls on-off of the second semiconductor switch according to the discharged condition.

An inversion step of an existing UPS is unnecessary, and in this inversion step, EMI is primarily generated, faults are frequently caused, and the cost is the highest. In this embodiment of the invention, this repeated step is omitted, so that the reliability of the UPS is improved, EMI is reduced, the size and the cost are reduced, and the requirements for energy conservation, emission reduction and environmental friendliness are met. A rectifying circuit in a load is not used for rectification, and is only used for one-way conduction when the DC is supplied, so that the EMI caused by double rectification during power supply of the existing UPS is reduced.

BRIEF DESCRIPTION OF THE SEVERAL VIEWS OF THE DRAWINGS

FIG. 1 is a construction block diagram of an uninterruptible power supply of the prior art;
FIG. 2 is a comparison diagram of an existing UPS and an UPS of an embodiment of the invention.

DETAILED DESCRIPTION OF THE INVENTION

Figure 3:
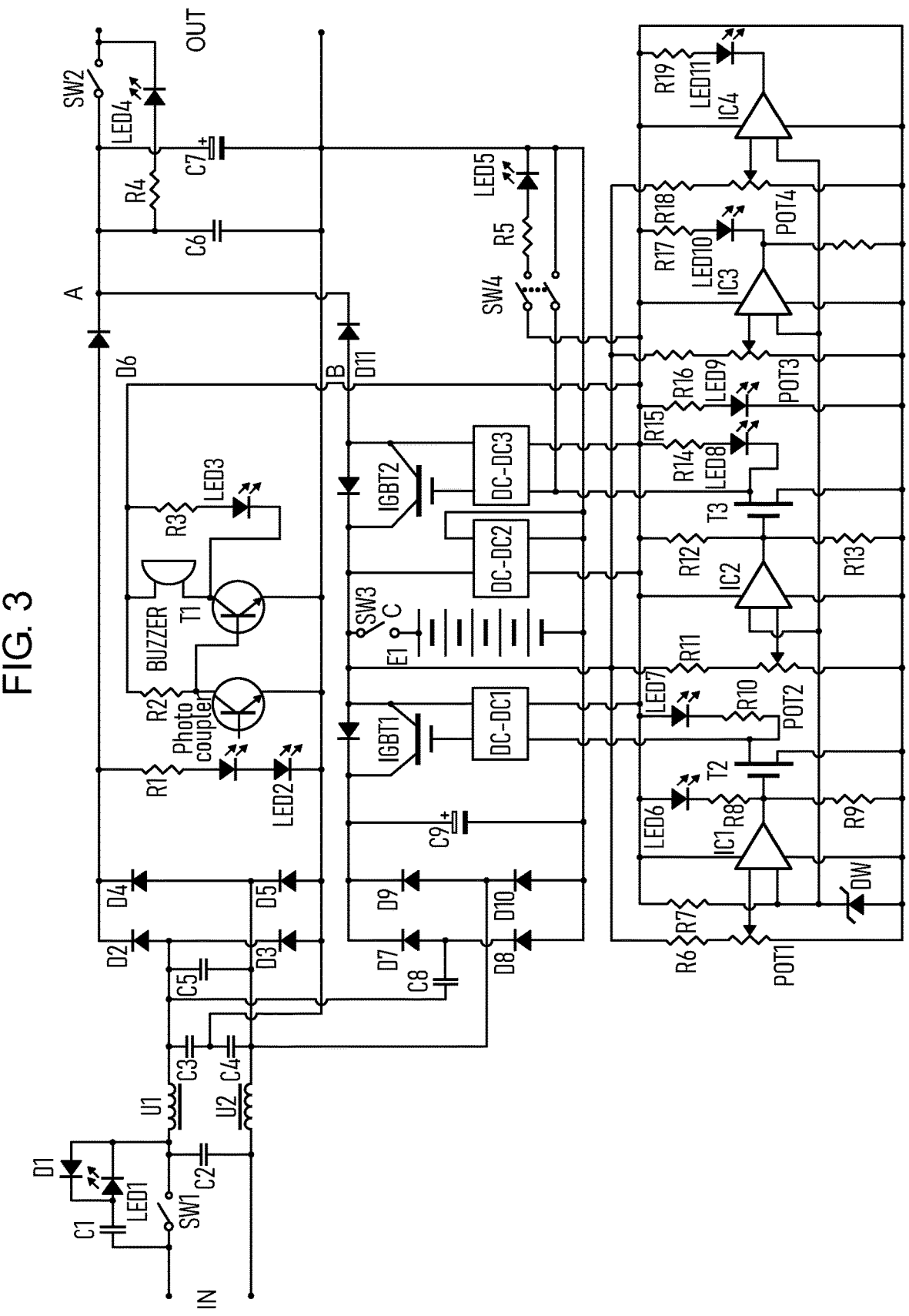
FIG. 3 is a schematic diagram of a circuit of UPS in this embodiment of the invention.

Most existing electronic equipment converts alternating currents from a power network into direct currents, which are in turn inverted to be supplied to target electronic equipment. Afterwards, the target electronic equipment supplies power to loads through AC-DC conversion-switching power supply-DC voltage transformation, or through AC/DC conversion-switching power supply-frequency conversion.

Meanwhile, most computers, home appliances, equipment controlled by frequency converters, and equipment to which power is supplied by means of switching power supplies provide new frequencies and voltages, which are generated after external power supplies are rectified and inverted, to the equipment.

The inventor finds that, now and later, the electric equipment is adapted to the power network basically within a range from AC80 to 265V and thus, voltage stabilization is no longer necessary for an uninterruptible power supply (called UPS for short hereinafter); and power frequencies are generated by a user terminal power supply (such as a servo motor) as required by the equipment, so that it makes no difference whether the UPS outputs power frequencies or other frequencies; and what only matters is that the USP should be able to filter spike interferences in the power network and to reliably supply power to the equipment as needed during the fault of the power network.

Clearly, the inversion link of the existing UPS is unnecessary, it is mainly in this inversion link that EMI is generated and that faults are frequently caused, and this link is also the costliest.

FIG. 2 is a comparison diagram of the existing UPS and an UPS of an embodiment of the invention. As can be seen from FIG. 2, the needless inversion link is omitted in this embodiment of the invention.

The UPS in this embodiment of the invention is supplied with an AC by the power network or by other devices and then rectifies the AC into a pulsating DC, and finally, DC voltages are output to control the charging of a battery. At the electric equipment side, a rectifying part does not work actually, and the DC voltages are inverted into AC voltages to drive a load to work. Or, in another solution, the inverted AC voltages are rectified into the DC voltages to drive the load.

Thus, the reliability of the UPS in this embodiment is improved, EMI is reduced, the size and cost are reduced, and the requirements for energy conservation, emission reduction, and environmental friendliness are met. A rectifying circuit in the load is not used for rectification, and is only used for one-way conduction when the DC is supplied, so that EMI caused by double rectification during power supply of the existing UPS is reduced.

FIG. 3 is a schematic diagram of the UPS in this embodiment of the invention. The UPS includes a rectifying unit used for rectifying a filtered AC and outputting a DC, a charging control unit used for realizing charging protection and discharging protection of a battery, as well as a switching unit used for selectively outputting the DC from the rectifying unit or the DC from the battery.

In one embodiment, the UPS further includes an EMI filter unit used for preventing surges and/or fast voltage surges, and/or protecting the power network against EMI from UPS users.

The UPS includes part or all of the circuit parts or units mentioned above. Specific examples of the circuit parts or units are given below, but the invention is not limited to these examples.

As shown in FIG. 3, the EMI filter unit may adopt LC filtering and specifically includes capacitors C2, C3, C4, and C5 and inductors U1 and U2, wherein C5 may have a large capacity. When power is supplied by an external power network, if the power network is struck by lightning and generates large overvoltage pulses, over-voltages are absorbed by C2, U1, and U2 because voltage leaps are not available at two ends of C5, an over-current switch SW1 may be tripped by over-currents generated by higher overvoltages to protect the equipment against damage, and a power network overload indicator LED1 lights on. The power supply eliminates various interferences on the power network through the EMI filter unit consisting of the switch SW1, C2, C3, C4, C5, U1, and U2.

Or, the rectifying unit may be, for instance, a full-wave rectifying unit consisting of D2-D5. An AC subjected to EMI filtering is rectified by D2-D5, and is then output to the electric equipment through D6 and an overcurrent protection switch SW2. A work indicator lamp LED2 lights on when a rectifying power supply part normally supplies DC voltages to the electric equipment. Those skilled in this field should be aware that rectifying circuits of other types are also feasible. A capacitor C6 may be used to further eliminate high-frequency interferences.

The switching unit is used for switching between AC supply and battery power supply. In one embodiment, the switching unit primarily includes a diode D11 which has a negative electrode coupled to an output terminal of the rectifying unit and a positive electrode coupled to a positive electrode of the battery. When rectified pulsating DC voltages of the power network are obviously lower than voltages of the battery or the power network is interrupted, the voltage of the negative electrode of the diode D11 is lower than the voltage of the positive electrode of the diode D11, so that the diode D11 is turned on, and the voltages from the battery are output through SW2.

In one embodiment, the switching unit further includes a capacitor C7 which is mainly used for providing a power supply delay for the load during interruption of the power network instead of for filtering, and so that buffering between voltage output during normal power supply by the power network and power supply by the battery during voltage interruption of the power network is realized.

Energy stored in the battery is automatically supplied to the load to guarantee seamless switching, so that power can be stably supplied all the time, and impact to the load is small. In this embodiment, the diode having the one-way conduction function is used for automatic switching between the power network and the battery, the load can be switched from power network power supply, to capacitor power supply and then to battery power supply without voltage interruptions, and the whole switching process is systematic and automatic and is completed within little switching time, so that impact interferences are hardly caused to the equipment, and the load is effectively protected.

The switching unit may further include a power network detection circuit, which consists of photoelectric couplers, R1 and R2, T1, a buzzer R3, and an LED3 and is used for providing a sound-light prompt when power is supplied by the UPS battery during the interruption of the power network. When the power network supplies power normally, currents pass through the photoelectric coupler R1 and the light-emitting diode LED2, and LED2 lights on; meanwhile, the photoelectric couplers lower grid voltages of the triode T1 during work, and thus, T1 does not work. When the power network is interrupted and power is supplied by the battery, the voltages from the battery increase the grid voltages of T1 through R2, so that T1 works, LED 3 lights on, and the buzzer rings.

The diode D6 is used for isolating rectified voltages of the power network from the voltages of the battery, so that the voltages of the battery will not act on the power network detection circuit through R1.

The battery is charged by the charging control unit so as to supply power to the load when necessary.

In one embodiment, the charging control unit is coupled to the EMI filter part through a capacitor C8 and is simple, reliable and free of EMI interferences of an electronic circuit constant-current source, and avoids the high fault rate of the electronic circuit constant-current source based on a constant current principle of performing capacitive-reactance current limiting on the AC by means of the capacitors. By changing the capacity of the constant-current capacitor C8, charging currents of the UPS at different powers are controlled to the optimal charging currents $\frac{1}{10}C$ of the battery. For example, currents of about 10 A can flow through a 145 MFD capacitor when the frequency of an input power supply is 50 Hz, and can be used for charging a battery having a capacity of 100 Ah. Of course, constant currents can also be supplied by means of other constant-current electronic circuits.

The charging control unit can be independently equipped with a rectifying circuit, such as a full-wave rectifying circuit, consisting of D7-D10. Charging currents are rectified through D7-D10 and are then used for charging a battery pack E1. The switch SW3 is switched on in normal circumstances and is switched off when unused or in a transportation process.

A charging control part may include a detection circuit used for judging whether or not the battery is fully charged.

In figures, a plurality of detection circuits IC1, IC2, IC3, and IC4 are configured. Different detection circuits can be configured to detect the voltage level of the battery. A control unit can control charging and/or output of the battery according to a detection result.

The detection circuit IC1 can judge whether or not the battery is fully charged; meanwhile, a semiconductor switch is coupled between the output terminal of the rectifying circuit and the battery and is, for instance, an insulated gate bipolar transistor IGBT1, and a backward diode is connected between the source and the drain of the IGBT1. Of course, the semiconductor switch can also be an MOS transistor, a triode, or a SCR.

In the charging process, the detection circuit IC1 outputs a high level, the MOS transistor T2 connected to the output terminal of the IC1 is turned on, voltages of the drain of T2 are lowered, DC-DC1 output a high level, IGBT1 is turned on, and a rectified pulsating DC is used for charging the batteries (E1) through IGBT1; and meanwhile, the drain of T2 is lowered, so that a charging indicator LED7 lights on. When detecting that the battery is fully charged (namely the voltages of the battery are high), the detection circuit IC1 outputs a low level, so that the MOS transistor T2 connected to the output terminal of IC1 is turned off, and a DC-DC isolated power supply unit DC-DC1 is powered off to turn off IGBT1, and then charging is stopped; and meanwhile, LED6 lights on to indicate that the battery is fully charged. DC-DC1 is used for DC isolation.

Because the battery pack is a constant-current source load, fast interference pulses in the power network and over-voltages which cannot be completely eliminated by an EMI suppression circuit of the UPS can be effectively absorbed by a low internal resistance of the battery pack.

When the UPS battery is discharged under the condition where the battery power is, for instance, higher than 20%, the detection circuit IC2 outputs a high level, an MOS transistor T3 connected with IC2 is turned on, DC-DC3 (used for DC isolation) outputs a high level, IGBT2 is turned on, and power from the battery is output to the load through D11; and meanwhile, a green lamp LED8 lights on. In an embodiment, LED8 and LED9 are packaged in a tube, wherein LED9 is a red lamp, so that when both the green lamp LED8 and the red lamp LED9 light on, yellow lights are emitted to given an alarm to cut off the power.

When the detection circuit IC2 detects that the battery is completely discharged, IGBT2 is turned off to stop UPS output, so that the service life of the battery is prolonged; at this moment, LED8 lights off; the red lamp LED9 is still connected with the power supply and thus is kept on. Of course, IGBT2 can also be replaced with a MOS transistor, a triode, or a SCR.

The detection circuit IC3 turns on a green light LED10 when the battery power is higher than 50%. The detection circuit IC4 turns on a green lamp LED11 when the battery power is higher than 80%. The LED11 indicator lamp lights off when the battery power is lower than 80%. The LED10 indicator lamp lights off when the battery power is lower than 50%.

DC-DC2 is used for providing working voltages for the detection circuits and can provide, for instance, a 12V power supply under 80-120V supply voltages.

When the power supply time has to be prolonged in an emergency, an emergency power switch SW4 is switched on, and LED5 lights on at this moment; currents of the battery are output through R5; and the UPS battery, without protection, will be completely discharged, and this provides an effective emergency means for military fire-fighting emergency rescues and other emergencies.

The uninterruptible power supply may further include over-current protection switches, such as SW2, which are used to interrupt the UPS output in an overcurrent situation or a short-circuit situation during load output, and meanwhile, an overcurrent indicator lamp LED4 lights on to protect the UPS and the load.

The above control circuit charged in a constant current manner can be formed in any way. A working state indicator circuit of the UPS can be formed in any way and can be displayed through a LCD, a liquid crystal, or the like.

In the embodiment of the invention, the UPS directly supplies power to the load in an AC-DC mode, and omits the inversion step of the traditional UPS and double rectification of the load, so that the use ratio of the power supply is increased, the circuit is simplified, the cost of the UPS is only one-fifth to one-tenth that of a main controller of the traditional UPS, electromagnetic radiation is reduced by 50-90%, interferences on the power network and electric equipment are greatly reduced, energy is saved by 5-25%, the serving time of the UPS battery is prolonged by 5-25%, the reliability of the UPS is greatly improved, and the UPS is a green, energy-saving and environment-friendly product having broad military-civilian application prospects.

The UPS can be applied to computers, televisions, variable-frequency control refrigerators, various charging devices, variable-frequency air conditioners, variable-frequency adjustable-speed elevators, fire-fighting emergency lighting, and other LED lighting lamps based on IC intelligent power supply, and the like.

The UPS is not suitable for equipment, such as LED lamps subjected to voltage reduction through capacitors, electrical appliances subjected to voltage reduction through transformers, as well as fundamental-frequency AC motors directly supplied with power by means of fundamental-frequency power supplies.

The above embodiments are only preferred ones of the invention, and are not intended to limit the protection scope of the invention. Transformations or replacements easily achievable by those skilled in this technical field within the technical scope disclosed by the invention are ought to be within the protection scope of the invention. Therefore, the protection scope of the invention should be subject to the protection scopes of the claims.

What is claimed is:

1. An uninterruptible power supply, comprising a first rectifying unit, a battery control unit, an output terminal, and a switching unit,
wherein:
the first rectifying unit is used for rectifying an AC and outputting a pulse/rippled DC;
a battery is controlled by the battery control unit to be charged by the pulsed/rippled DC and discharged, and outputs a DC during interruption of the AC; and
the switching unit is used for selectively outputting the pulse/rippled DC from the rectifying unit or the DC from the battery so as to serve a load containing an inverter;
wherein a voltage stabilizing unit is omitted; and
wherein the switching unit comprises a capacitor connected to the output terminal of the power supply for providing a power supply delay for the load during an interruption so that buffering between voltage output during normal power supply by a power network and power supply by the battery during voltage interruption of the power network is realized.

2. The uninterruptible power supply according to claim 1, further comprising a charging control unit, wherein the charging control unit is coupled to the AC through a first capacitor or an electronic circuit to supply constant charging currents to the battery.

3. The uninterruptible power supply according to claim 1, wherein the battery control unit comprises a second rectifying circuit used for rectifying an AC, and voltages obtained after rectification are supplied to charge a battery.

4. The uninterruptible power supply according to claim 1, wherein the battery control unit comprises a detection circuit used for detecting voltages of a battery, so that charging or discharging of the battery is controlled according to a detection result.

5. The uninterruptible power supply according to claim 4, wherein the detection circuit comprises a first IC chip; said battery control unit comprises a first semiconductor switch having a source and a drain, and a first DC-DC converter; and a backward diode is connected between the source and the drain of the first semiconductor switch; and the detection circuit detects whether or not the battery is fully charged and the first DC-DC converter controls on-off of the first semiconductor switch according to a charged condition of the battery.

6. The uninterruptible power supply according to claim 4, wherein the detection circuit comprises a second IC chip; the battery control unit comprises a second semiconductor switch coupled between the battery and a switching unit, and a backward diode is connected between the source and the drain of the second semiconductor switch; said battery control unit comprises a third DC-DC converter; and the detection circuit detects a discharged condition of the battery and the third DC-DC converter controls on-off of the second semiconductor switch according to the discharged condition;

said switching unit comprises a diode which has a negative electrode coupled to an output terminal of a rectifying unit and a positive electrode coupled to a positive electrode of a battery.

7. The uninterruptible power supply according to claim 4, wherein the battery control unit further comprises a plurality of indicator lamps which are controlled according to battery power detected by the detection circuit to indicate a respective state of charge of the battery.

8. The uninterruptible power supply according to claim 4, wherein the battery control unit further comprises a second DC-DC converter to couple the battery and used for providing working voltages for the detection circuit.

9. The uninterruptible power supply according to claim 1, further comprising overcurrent protection switches which interrupt a UPS output in a high-power overvoltage situation of an input power supply, or in an overcurrent situation or a short-circuit situation during load output.

10. The uninterruptible power supply according to claim 1, further comprising an emergency power switch used for providing a voltage output of a UPS battery in an emergency.

11. The uninterruptible power supply according to claim 1, wherein the uninterruptible power supply does not comprise an inverter.

12. The uninterruptible power supply according to claim 1, further comprising an EMI filter unit used for preventing surges and/or fast voltage surges, and/or protecting the power network against EMI from UPS users.

* * * * *